(12) United States Patent
Skiba et al.

(10) Patent No.: US 8,964,962 B1
(45) Date of Patent: Feb. 24, 2015

(54) DIALOG REORDER

(71) Applicant: Avaya Inc., Basking Ridge, NJ (US)

(72) Inventors: David Skiba, Golden, CO (US); George Erhart, Loveland, CO (US); Lee Becker, Allentown, NJ (US); Valentine C. Matula, Granville, OH (US)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 14/043,266

(22) Filed: Oct. 1, 2013

(51) Int. Cl.
*H04M 3/00* (2006.01)
*H04M 3/51* (2006.01)

(52) U.S. Cl.
CPC .................................. *H04M 3/5183* (2013.01)
USPC ...................................................... 379/265.09

(58) Field of Classification Search
USPC ...................................................... 379/265.09
See application file for complete search history.

(56) References Cited

U.S. PATENT DOCUMENTS

| | | |
|---|---|---|
| 6,522,742 B1 | 2/2003 | Crosby et al. |
| 2010/0296417 A1 | 11/2010 | Steiner |
| 2011/0255683 A1 | 10/2011 | Flockhart et al. |
| 2014/0143684 A1 * | 5/2014 | Oh et al. ............. 715/752 |

OTHER PUBLICATIONS

Childs et al. "Extracting and Normalizing Temporal Expressions," Lockheed Martin Corporation, 1998, 6 pages, retrieved from [aclweb.org/anthology-new/X/X98/X98-1011.pdf].

"Temporal Normalization and Comparison," Cognitive Computation Group, University of Illinois, Dec. 2011, 1 page, retrieved from [kitt.cl.uzh.ch/kitt/cltools/index.php/Temporal_Normalization_and_Comparison].

* cited by examiner

*Primary Examiner* — Rasha Al Aubaidi
(74) *Attorney, Agent, or Firm* — Sheridan Ross P.C.

(57) ABSTRACT

An automatic timeline and topic normalization mechanism is described along with various methods and systems for administering the same. The temporal correction system proposed herein creates fully interpreted and reordered representations of events within and external to a dialog, reducing the amount of time and expensive resources typically required for reading, comprehension, and response to written communications.

20 Claims, 6 Drawing Sheets

DIALOG REORDER

FIELD OF THE DISCLOSURE

The present disclosure is generally directed toward communications and more specifically toward contact centers.

BACKGROUND

Requests coming into contact centers today may take many forms beyond calls on traditional voice channels. Interactions with customers using channels like email, chat, and social media are increasing in frequency and number. New challenges are posed as the channels often contain long dialogs of information that represent a core dump of information. The core dump may be presented in a confusing and unclear jumble of statements. Furthermore, there may be several dialog turns back and forth between an agent, the customer, and others who may weigh in on a problem. There is no guarantee of order, validity, structure, or relevance of the information contained in these interactions. Because of the free form nature of the interactions, a burden falls on the agent or a supervisor to make sense of a conversation flow every time the agent works on a new work item.

Typically, contact center agents and supervisors read previous dialogs to understand the back and forth communications between parties. The agent and the supervisor may use timestamps (e.g., hours, days), keys, and other indicators to understand a timeline of events. Key phrases might include time keywords like "before this," "after that," and "then we did," "before that I noticed" and other indicators that serve as relative time references. Manually parsing all of the information can be time consuming and much of the information may be irrelevant. When the agent is required to manually parse and summarize data from the dialogs, time and efficiency are lost. Additionally, manual parsing and summarizing may lead to customer dissatisfaction as it forces the customer to wait while a new agent and/or supervisor gets up to speed on the problem in real time.

SUMMARY

These and other needs are addressed by the various aspects, embodiments, and/or configurations of the present disclosure. The present disclosure is directed to an automatic timeline and topic normalization mechanism which presents a contact center agent with a clean, ordered problem set derived from written correspondence between a customer and a contact center. The ordered problem set, in some embodiments, enables a contact center agent or other observer of the interaction to quickly and efficiently assess the interaction history as well as address relevant issues within a free-form work item without taking time to parse and summarize existing communications and/or requiring direct questions back to the customer.

In some embodiments, the automatic timeline and topic normalization mechanism uses language analysis technologies to solve the problems above with timeline, relevance, and reordering of the events described. Normalization is one process for evaluating and correcting data that is often used as part of speech recognition in conjunction with other analyses. In some embodiments, key components and/or events within an interaction or communication are identified, dependent attributes are defined, and conversion to normal form takes place. Tight analysis can provide a distinct order: X happened, and then Y happened whereas loose analysis may reveal events in order: it vibrated, glowed, smoked, and then caught on fire. An agent might receive a loose analysis, invoke tight analysis, and ask clarifying questions. An additional analysis might include tying the events back to a company or contact center database: a technician came, and then I called in. An optional analysis might include tying outages and issues back to external events that can be used to order events within a communication: tornado hit that day at 6:45 PM.

A way to add clarity to a jumble of information is to apply temporal normalization of a customer's language. When a customer explains his or her problem, the problem may be delivered as a stream of consciousness narrative rather than a linear sequence through the steps that lead to the current state and/or issue. For example, someone might give a long explanation about the steps taken to debug a problem with his service, and subsequently say, "...and before all that we had a power outage." Presenting the agent with a normalized timeline account of the events described by the customer in concert with other analyses can help the agent quickly understand the current status of a customer's problem and respond appropriately.

The automatic timeline and topic normalization mechanism, in some embodiments, is capable of identifying actionable, past actionable, and irrelevant spans in customer-to-business conversations. This form of summarization can be done by organizing, in time, some or all events and/or steps in a customer-to-business conversation. In addition, the topic normalization mechanism can be adapted to account for the relevance of each event or step to the goal of the agent, supervisor, and/or contact center, highlight important steps, and depreciate and/or omit irrelevant steps in order to allow the agent to focus on information the agent can take action on versus the information that is superfluous and/or irrelevant. Removal of irrelevant items is a part of the temporal reorder through the process of simplification.

The use of language analyses to temporally reorder meandering communication from customers to a company or contact center reduces the amount of time and resources required for reading, comprehension, and response to written communications.

These and other advantages will be apparent from the disclosure.

In some embodiments, a method is provided that generally comprises:
 receiving a message containing a plurality of message elements in a first order;
 determining that the plurality of message elements are not in a proper temporal order when in the first order;
 in response to determining that the message element are not in a proper temporal order, identifying a second order for the plurality of message elements; and
 presenting the plurality of message elements in the second order via a user interface of a communication device.

The term "automatic" and variations thereof, as used herein, refers to any process or operation done without material human input when the process or operation is performed. However, a process or operation can be automatic, even though performance of the process or operation uses material or immaterial human input, if input is received before performance of the process or operation. Human input is deemed to be material if such input influences how the process or operation will be performed. Human input that consents to the performance of the process or operation is not deemed to be "material."

The term "computer-readable medium" as used herein refers to any storage and/or transmission medium that participate in providing instructions to a processor for execution. Such a medium is commonly tangible and non-transient and can take many forms, including but not limited to, non-volatile media, volatile media, and transmission media and includes without limitation random access memory ("RAM"), read only memory ("ROM"), and the like. Non-volatile media includes, for example, NVRAM, or magnetic or optical disks. Volatile media includes dynamic memory, such as main memory. Common forms of computer-readable media include, for example, a floppy disk (including without limitation a Bernoulli cartridge, ZIP drive, and JAZ drive), a flexible disk, hard disk, magnetic tape or cassettes, or any other magnetic medium, magneto-optical medium, a digital video disk (such as CD-ROM), any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored. Computer-readable storage medium commonly excludes transient storage media, particularly electrical, magnetic, electromagnetic, optical, magneto-optical signals.

The term "customer" or "client" denotes a party patronizing, serviced by, or otherwise doing business with a contact center, business, or enterprise.

The term "language" as used herein refers to any form of expression and/or communication that includes words, signs, symbols, and the equivalents thereof. The expression and/or communication may be in any single language or may include a combination of multiple languages.

A "database" as used herein refers to an organized set of data held in a computer. The organization schema or model for the data can, for example, be hierarchical, network, relational, entity-relationship, object, document, XML, entity-attribute-value model, star schema, object-relational, associative, multidimensional, multi-value, semantic, and other database designs.

The terms "determine," "calculate," and "compute," and variations thereof as used herein, are used interchangeably and include any type of methodology, process, mathematical operation or technique.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The term "module" as used herein refers to any known or later developed hardware, software, firmware, artificial intelligence, fuzzy logic, or combination of hardware and software that is capable of performing the functionality associated with that element. Also, while the disclosure is presented in terms of exemplary embodiments, it should be appreciated that individual aspects of the disclosure can be separately claimed.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below.

DETAILED DESCRIPTION

Figure 1A:
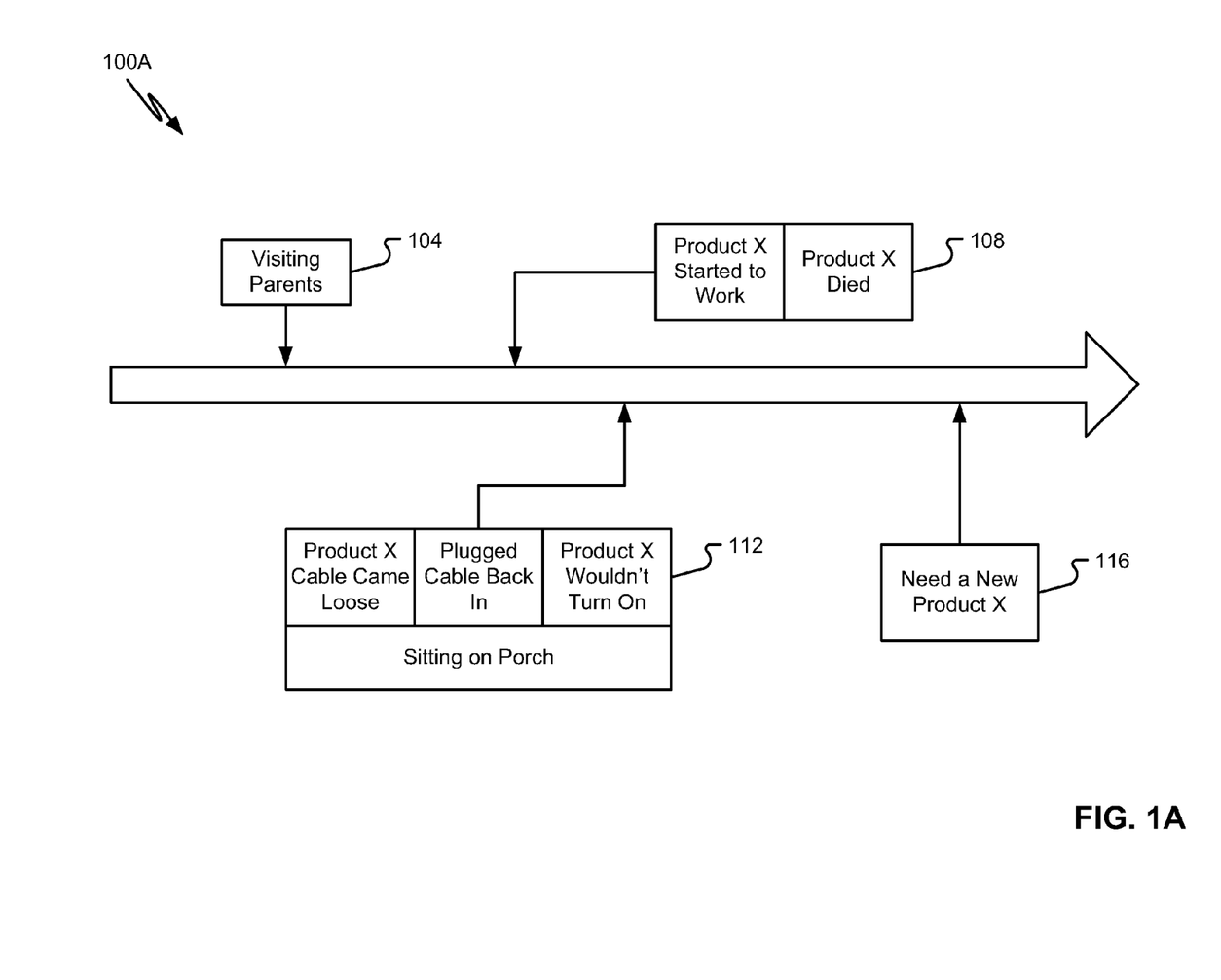
FIG. 1A is an example of a service chat session in accordance with embodiments of the present disclosure.

FIG. 1A is an illustrative embodiment of a service chat session in accordance with at least some embodiments of the present disclosure. An automatic timeline and topic normalization mechanism in a communication system receives a work item from a customer. The work item can include several message elements, some of which are important and actionable, and some of which are irrelevant. A temporal correction module is operable to receive a first message element 104, a second message element 108, a third message element 112, and a fourth message element 116. Each of the message elements 104, 108, 112, 116 could be identified in a first order and one or more of the message elements may comprise a plurality of sub-elements having a first sub-order.

In some embodiments, the message elements 104, 108, 112, 116 may require reordering from the first order to a second order to provide enhanced delivery and presentation to an agent. Message elements 104, 108, 112, 116 may include events like "product didn't work" or "product died" as non-limiting examples that can be reordered based on temporal an analysis performed by a temporal correction module. Additionally, the temporal correction module can remove one or more insignificant or non-actionable message elements 104, 108, 112, 116 for efficient summarization where the presentation of a new order of message elements 104, 108, 112, 116 may or may not include all of the message elements 104, 108, 112, 116 from the work item.

In a non-limiting example, customer Tim initiates a customer service chat session with a long, monologue-like explanation that includes the following details:

Last week, while I was sitting in on my front porch using my router, my power cable came loose and when I plugged it back in, it wouldn't turn on. This morning it started to work again, but only for a few minutes, and then it died. Actually the cable came loose a month ago as well when I was visiting my parents. It's still under warranty and I need a replacement now.

While the text above is not structured in exact chronological order, temporal analysis can reorder message elements within the customer's dialog and produce a timeline summary in dialog 100A. In addition to construction of the timeline, additional analyses can be performed to help the agent to better understand which of the described message elements are relevant and actionable.

When Tim says, I was visiting my parents and the cable came loose, the only portion of that event that is important is that the cable came loose. When Tim explains that the router started to work and then died, both events are relevant, but the fact that the router died may be the only actionable part of that event. When Tim writes that the cable came loose and that he plugged it in and the router didn't work, the only portion that may be actionable is that the router wouldn't turn on (no longer functional). The system may determine that Tim needs a replacement based on the actionable events in the dialog 100A. The system can also run a query to the National Weather Service to see if there was any major weather activity that day which the system could optionally insert that might explain Tim's router outage.

Figure 1B:
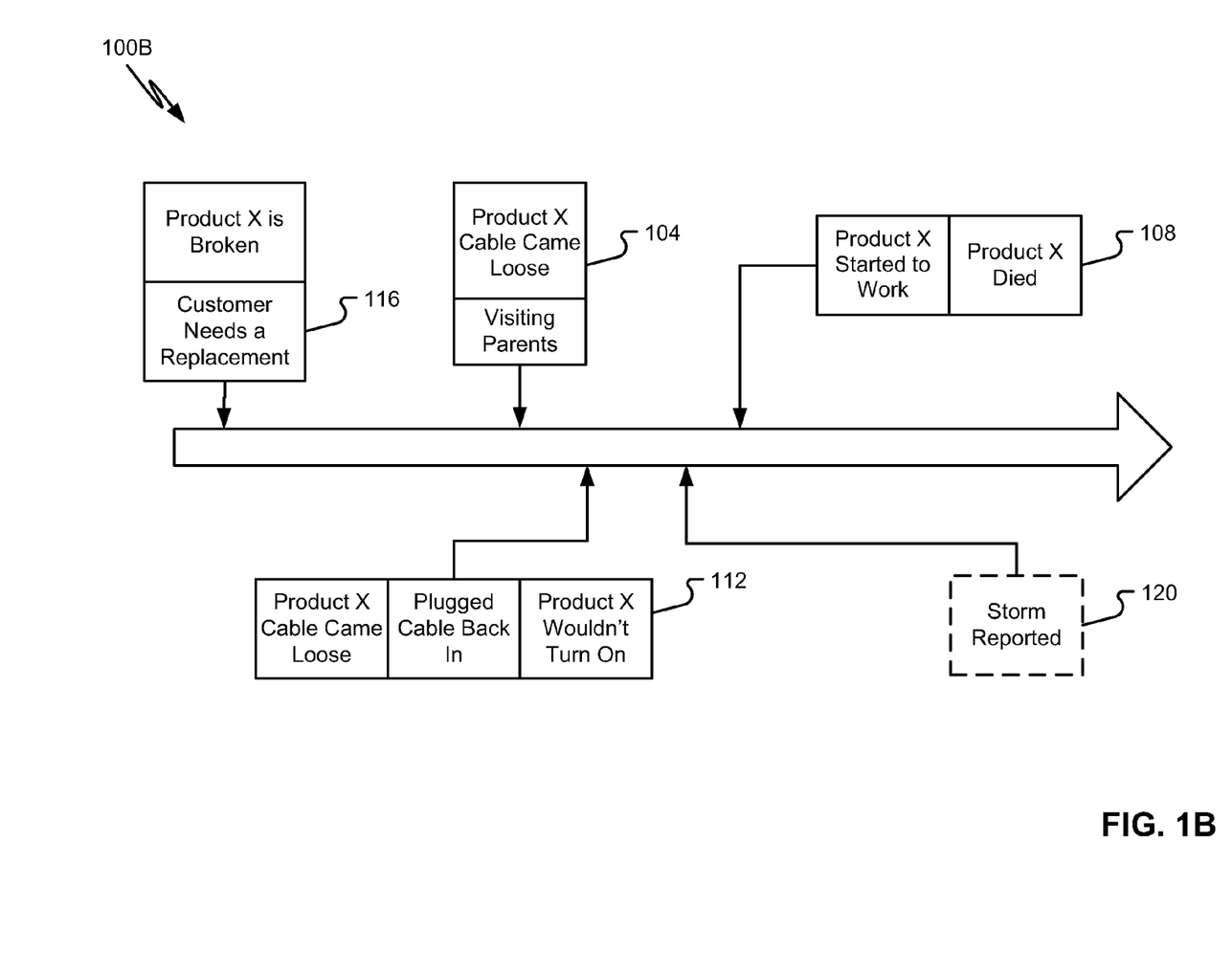
FIG. 1B is a reordered and normalized example of a service chat session in accordance with embodiments of the present disclosure.

FIG. 1B shows a reordered and normalized example of a service chat session in accordance with embodiments of the present disclosure. The message elements 104, 108, 112, 116 have been reordered both chronologically and logically to 116, 104, 112, 108.

The temporal correction module may also insert one or more external event indicators into the reordered message element timeline. An external event indicator 120 may include, but is not limited to, agent service notes, information on a weather occurrence, time and details regarding a power outage and/or power interruption, flight time and other flight information, and other message elements from a second message. The work item message elements 104, 108, 112, 116 and the external event indicators 120 may be organized to improve agent understanding and handling of the work item.

In addition to producing a reordered version of the message elements 104, 108, 112, 116 within the dialog and optionally adding the external event indicator 120, the system may also generate a complete and temporally reordered set of events 100B to display to the agent and/or a manager to allow for issue resolution with a high degree of efficiency and customer satisfaction.

In a second non-limiting example, Tim's chat session is routed to a manager as the system has detected the keyword "died," and Tim explains the problem:

My router that you replaced two months ago is broken. I had problems with it when I was visiting my parents and again when I was sitting on the porch. I'm really getting tired of dealing with the flakiness of this particular router. I haven't had problems with your stuff in the past, so I'm willing to give you one more try before I move on to something else.

The temporal correction module may perform an analysis of the message elements in the chat and on the call. The message elements may be removed or placed in order and put on a timeline, including information like "product is broken" and "product wouldn't turn on." The timeline display can be updated with the new reordered set of events 100B with details, helping the manager to better understand the chain of events leading up to the current inquiry. The manager is able to give Tim a richer service experience by echoing back and confirming some of the background and reassuring Tim that he can send him out a new product right away.

Figure 2:
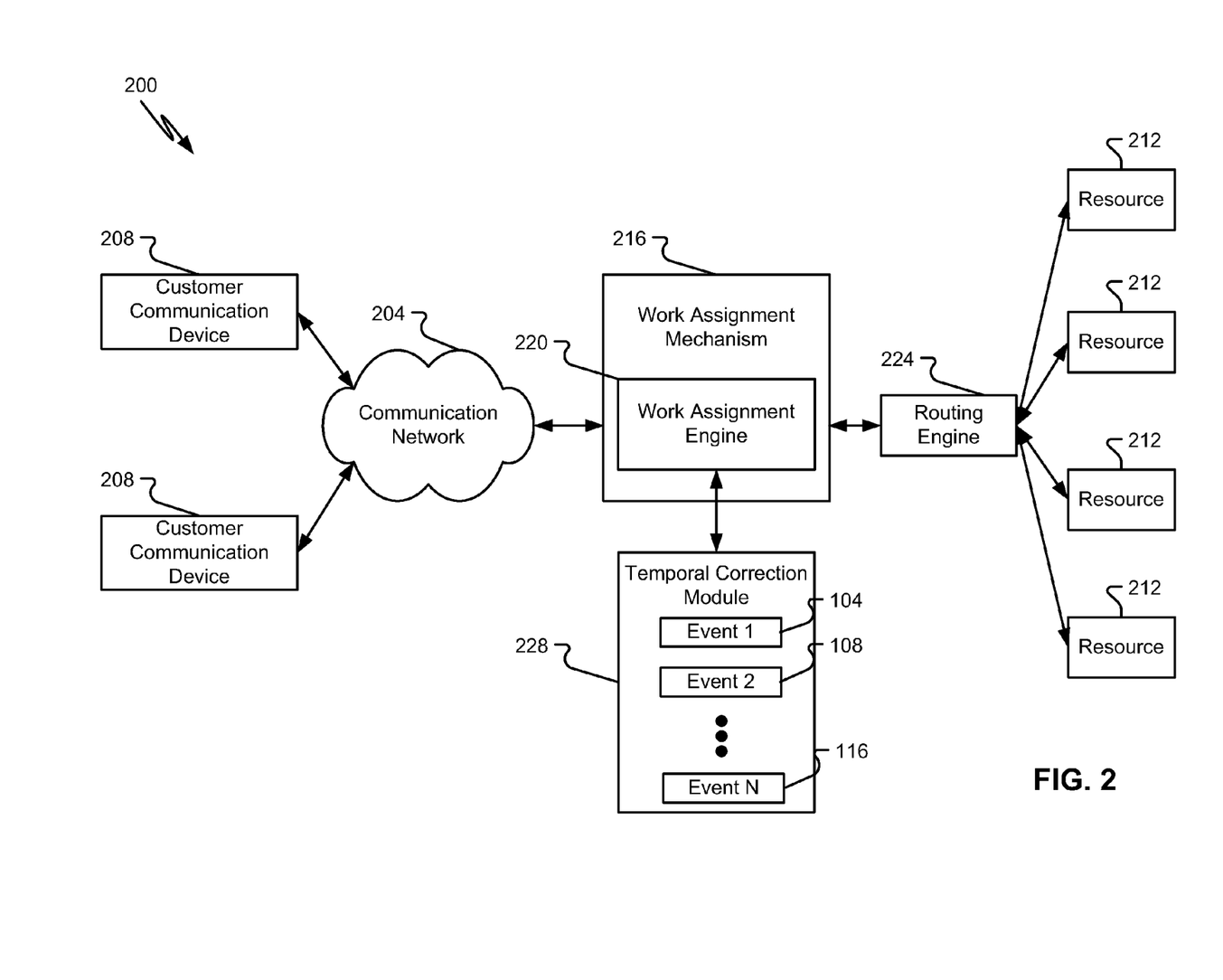
FIG. 2 is a block diagram of a communication system in accordance with embodiments of the present disclosure.

FIG. 2 depicts a communication system 200 in accordance with at least some embodiments of the present disclosure. The communication system 200 may be a distributed system and, in some embodiments, comprises a communication network 204 connecting one or more customer communication devices 208 to a work assignment mechanism 216, which may be owned and operated by an enterprise administering a contact center in which a plurality of resources 212 are distributed to handle incoming work items from the customer communication devices 208.

In accordance with at least some embodiments of the present disclosure, the communication network 204 may comprise any type of known communication medium or collection of communication media and may use any type of protocols to transport messages between endpoints. The communication network 204 may include wired and/or wireless communication technologies. The Internet is an example of the communication network 204 that constitutes an Internet Protocol (IP) network consisting of many computers, computing networks, and other communication devices located all over the world, which are connected through many telephone systems and other means. Other examples of the communication network 204 include, without limitation, a standard Plain Old Telephone System (POTS), an Integrated Services Digital Network (ISDN), the Public Switched Telephone Network (PSTN), a Local Area Network (LAN), a Wide Area Network (WAN), a Voice over Internet Protocol (VoIP) network, a Session Initiation Protocol (SIP) network, a cellular network, and any other type of packet-switched or circuit-switched network known in the art. In addition, it can be appreciated that the communication network 204 need not be limited to any one network type, and instead may be comprised of a number of different networks and/or network types. As one example, embodiments of the present disclosure may be utilized to increase the efficiency of a grid-based contact center. Examples of a grid-based contact center are more fully described in U.S. patent application No. 12/469,523, the entire contents of which are hereby incorporated herein by reference. Moreover, the communication network 204 may comprise a number of different communication media such as coaxial cable, copper cable/wire, fiber-optic cable, antennas for transmitting/receiving wireless messages, and combinations thereof The communication devices 208 may correspond to customer communication devices. In accordance with at least some embodiments of the present disclosure, a customer may utilize their communication device 208 to initiate a work item, which is generally a request for a processing resource 212. Exemplary work items include, but are not limited to, a contact directed toward and received at a contact center, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 204. For example, the work item may be transmitted as a telephone call, a packet or collection of packets (e.g., IP packets transmitted over an IP network), an email message, an Instant Message, an SMS message, a fax, and combinations thereof The work assignment mechanism 216 may employ any queue-based or queueless work assignment algorithm. Examples of queue-based work assignment skill-based algorithms include, without limitation, a fairness algorithm, pacing algorithm (which inserts rests into the agents work queue), value-based algorithms, limited algorithms (such as Business Advocate™ by Avaya, Inc.), and outsourcing algorithms. Other algorithms may consider other types of data inputs and/or may treat certain data inputs differently.

The format of the work item may depend upon the capabilities of the communication device 208 and the format of the communication. In particular, work items are logical representations within a contact center of work to be performed in connection with servicing a communication received at the contact center (and more specifically the work assignment mechanism 216). The communication may be received and maintained at the work assignment mechanism 216, a switch or server connected to the work assignment mechanism 216, or the like until a resource 212 is assigned to the work item representing that communication at which point the work assignment mechanism 216 passes the work item to a routing engine 224 to connect the communication device 208 to the assigned resource 212.

Although the routing engine 224 is depicted as being separate from the work assignment mechanism 216, the routing engine 224 may be incorporated into the work assignment mechanism 216 or its functionality may be executed by the work assignment engine 220.

In accordance with at least some embodiments of the present disclosure, the communication devices 208 may comprise any type of known communication equipment or collection of communication equipment. Examples of a suitable communication device 208 include, but are not limited to, a personal computer, laptop, tablet, cellular phone, smartphone, telephone, or combinations thereof. In general, each communication device 208 may be adapted to support video, audio, text, and/or data communications with other communication devices 208 as well as the processing resources 212. The type of medium used by the communication device 208 to communicate with other communication devices 208 or processing resources 212 may depend upon the communication applications available on the communication device 208.

In accordance with at least some embodiments of the present disclosure, the work item can be sent toward a collection of processing resources 212 via the combined efforts of the work assignment mechanism 216 and routing engine 224. The resources 212 can either be completely automated resources (e.g., Interactive Voice Response (IVR) units, processors, servers, or the like), human resources utilizing communication devices (e.g., human agents utilizing a computer, telephone, laptop, etc.), or any other resource known to be used in contact centers.

As discussed above, the work assignment mechanism 216 and resources 212 may be owned and operated by a common entity in a contact center format. In some embodiments, the work assignment mechanism 216 may be administered by multiple enterprises, each of which has their own dedicated resources 212a-n connected to the work assignment mechanism 216.

In some embodiments, the work assignment mechanism 216 comprises a work assignment engine 220 which enables the work assignment mechanism 216 to make intelligent routing decisions for work items. In some embodiments, the work assignment engine 220 may be configured to administer and make work assignment decisions in a queueless contact center, as is described in U.S. patent application Ser. No. 12/882,950, the entire contents of which are hereby incorporated herein by reference.

More specifically, the work assignment engine 220 can determine which of the plurality of processing resources 212 is qualified and/or eligible to receive the work item and further determine which of the plurality of processing resources 212 is best suited (or is the optimal processing resource) to handle the processing needs of the work item. In situations of work item surplus, the work assignment engine 220 can also make the opposite determination (i.e., determine optimal assignment of a work item resource to a resource). In some embodiments, the work assignment engine 220 can be configured to achieve true one-to-one matching by utilizing bitmaps/tables and other data structures.

The work assignment engine 120 may reside in the work assignment mechanism 116 or in a number of different servers or processing devices. In some embodiments, cloud-based computing architectures can be employed whereby one or more components of the work assignment mechanism 116 are made available in a cloud or network such that they can be shared resources among a plurality of different users.

In accordance with at least some embodiments of the present disclosure, a temporal correction module 228 comprises a web-based user interface that provides the resource 212 with a reordered and summarized and/or normalized rich display for efficient assistance when working on customer issues and/or work items. More specifically, the temporal correction module 228 can evaluate a dialog 100A containing message elements 104, 108, 112, 116 received as a work item from the communication network 204 from the customer communication device 208. Results of analyses, reordered timelines, additional external event indicators, and displays provided by the temporal correction module 228 can be used by the work assignment engine 220 to assist resources 212 as dialogs are received and routed to agents and/or supervisors.

Figure 3:
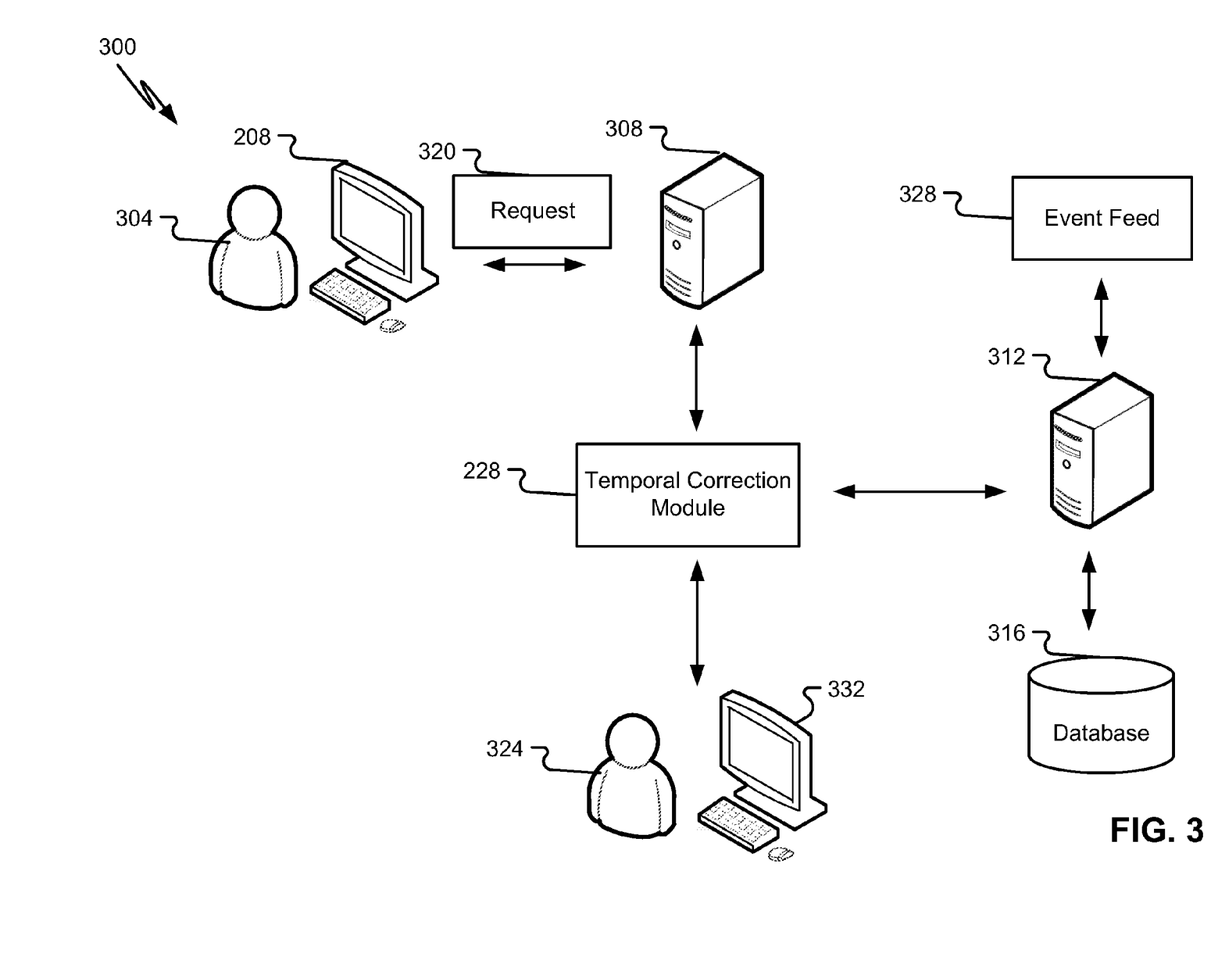
FIG. 3 is an example of a service request from a customer through an automatic timeline and topic normalization mechanism in accordance with embodiments of the present disclosure.

FIG. 3 illustrates an example of a request from a customer to a website that may make use of the temporal correction module 228. The request process 300 may include, in some embodiments, a customer 304 with a communication device 208 connected via the Internet to one or more web servers 308, which may be owned and operated by an enterprise administering a contact center. The customer 304 sends a request 320 to the web server 308. The request might be a query or a response to a query in a chat session, a post on a social media site managed by or for a company or contact center, a browser request from a web page, or other type of written communication. In the communication system 200, a temporal correction module 228, a work assignment mechanism 216, a routing engine 224, a database server 312, and a database 316 may be operable to set up a session to handle the incoming request and/or query from the customer 304 through the customer communication device 208.

Additionally, the communication system 200 can pull or receive information regarding external events, known as indicators, as they are fixed in time and can be used as references when analyzing a dialog. The external event indicators may also give clues as to outages or other service issues, depending on the time and date of the outage and/or issue. The information from the external event indicators may be provided by an event feed 328 that may pull information from RSS feeds. The event feed 328 may also provide information collected from agent service notes, weather reporting services, power company status changes, airline flight information, message elements from a second message, and other public and privately available internal, local, national, and global sources. All event data may be managed by an event server 312, pulling and pushing data used by the communication system 200 and stored in the company and/or contact center's database 316. All relevant message elements within the work item and external event data may be analyzed, reordered, and presented to the agent 324 via an agent workstation 332.

Figure 4:
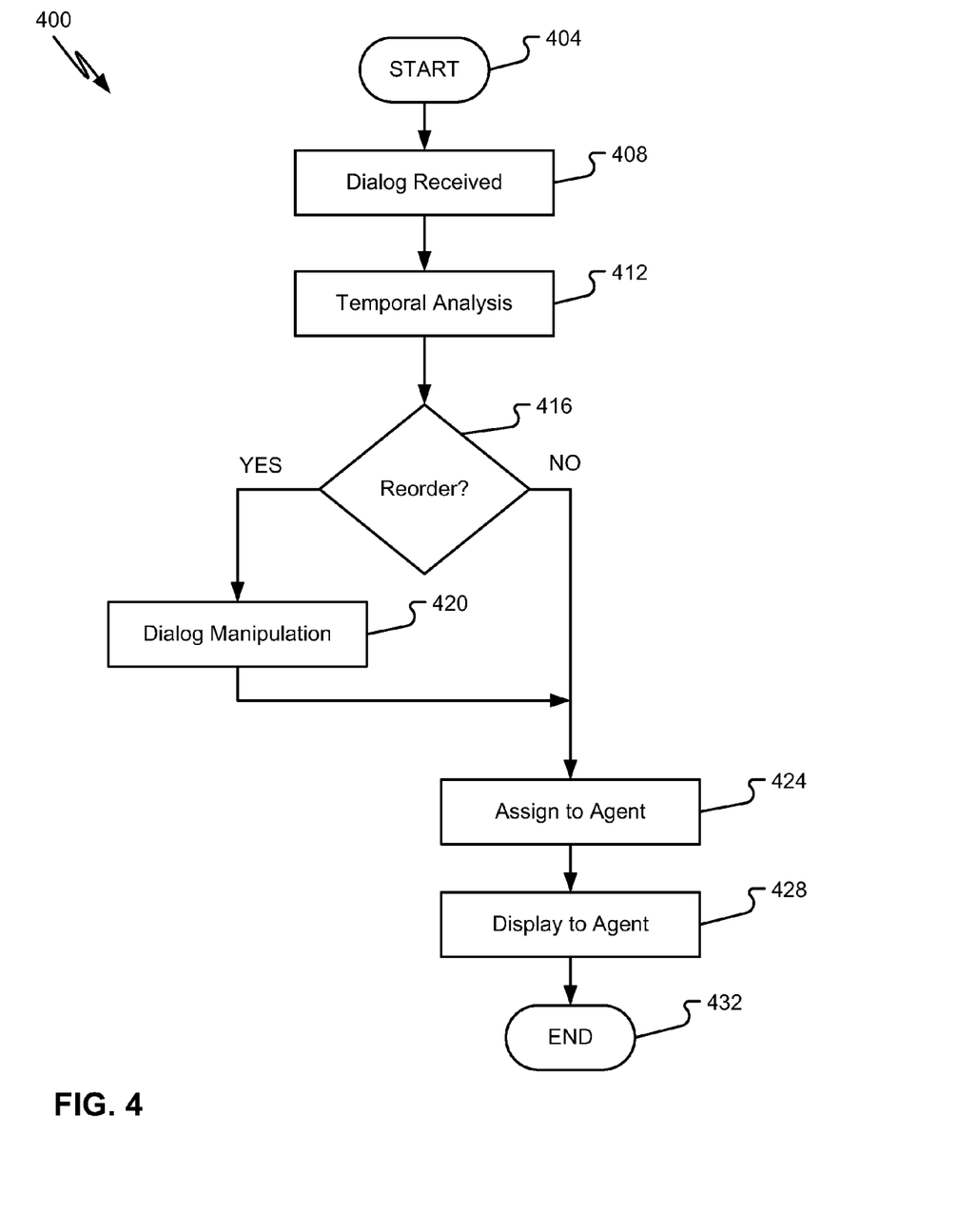
FIG. 4 is a flow diagram for receiving and manipulating message elements in a dialog in accordance with embodiments of the present disclosure.

With reference now to FIG. 4, aspects of a method 400 for receiving and reordering message elements in dialogs in accordance with embodiments of the present disclosure are depicted. Generally, the method 400 begins with a start operation 404 and terminates with an end operation 430. While a general order for the steps of the method 400 are shown in FIG. 4, the method 400 can include more or fewer steps or the order of the steps can be arranged differently than those shown in FIG. 4. The method 400 can be executed as a set of computer-executable instructions executed by a computer system and encoded or stored on a computer readable medium. Further, the method may also be embodied by a set of gates or other structures in an Application Specific Integrated Circuit (ASIC), a Field Programmable Gate Array (FPGA), or other configurable hardware component, module, or system. Hereinafter, the method 400 shall be explained with reference to the systems, components, modules, software, data structures, etc. described in conjunction with FIGS. 1-3.

Typically, the process idles at step 404 until a dialog 100A has been received, in step 408. In step 412, the temporal correction module 228 may run an analysis on the dialog 100A which may contain multiple message elements 104, 108, 112, 116. Once the message elements 104, 108, 112, 116 of the dialog 100A have been established, the temporal correction module 228 may determine if the message elements 104, 108, 112, 116 presented in the dialog 100A are in sequential order. The temporal correction module 228 may determine if the message elements 104, 108, 112, 116 can benefit from being reordered, in step 416. If the answer to the question is that the dialog 100A does need to be reordered, the dialog 100A may be analyzed and manipulated by the temporal correction module 228 to automatically put the message elements 104, 108, 112, 116 in order, remove unnecessary message elements 104, 108, 112, 116, and/or optionally add one or more external event indicators 120 into a second dialog 100B, in step 420. The analysis and manipulation by the temporal correction module 228 in step 420 may include execution of one or more algorithms to provide speech analysis, sentence structure tagging, intent matching, normalization of time-based entities, and other predictive, expressive, tense, aspect, explicit, and implicit object and attribute analyses and mechanisms.

Once the dialog manipulation in step 420 has been completed, the newly analyzed, reordered, and externally event anchored dialog 100B may be assigned to an agent 212, in step 424. Alternatively, if the answer to the question is that the dialog does not need to be reordered, the dialog may be assigned without manipulation to the agent 212, in step 424. The original dialog 100A and/or the new dialog 100B may be displayed to the agent 324 at the agent workstation 332, in step 428. The method 400 for receiving, analyzing, reordering, anchoring, and displaying message elements and external indicators in dialogs ends, at step 432. The process may begin again when a new dialog is received (step 408).

In an additional embodiment, the data presented may also be used by a management system to generate and provide responsiveness reports and performance metrics for agents, skills, and groups to a manager and/or a contact center administrator.

Figure 5:
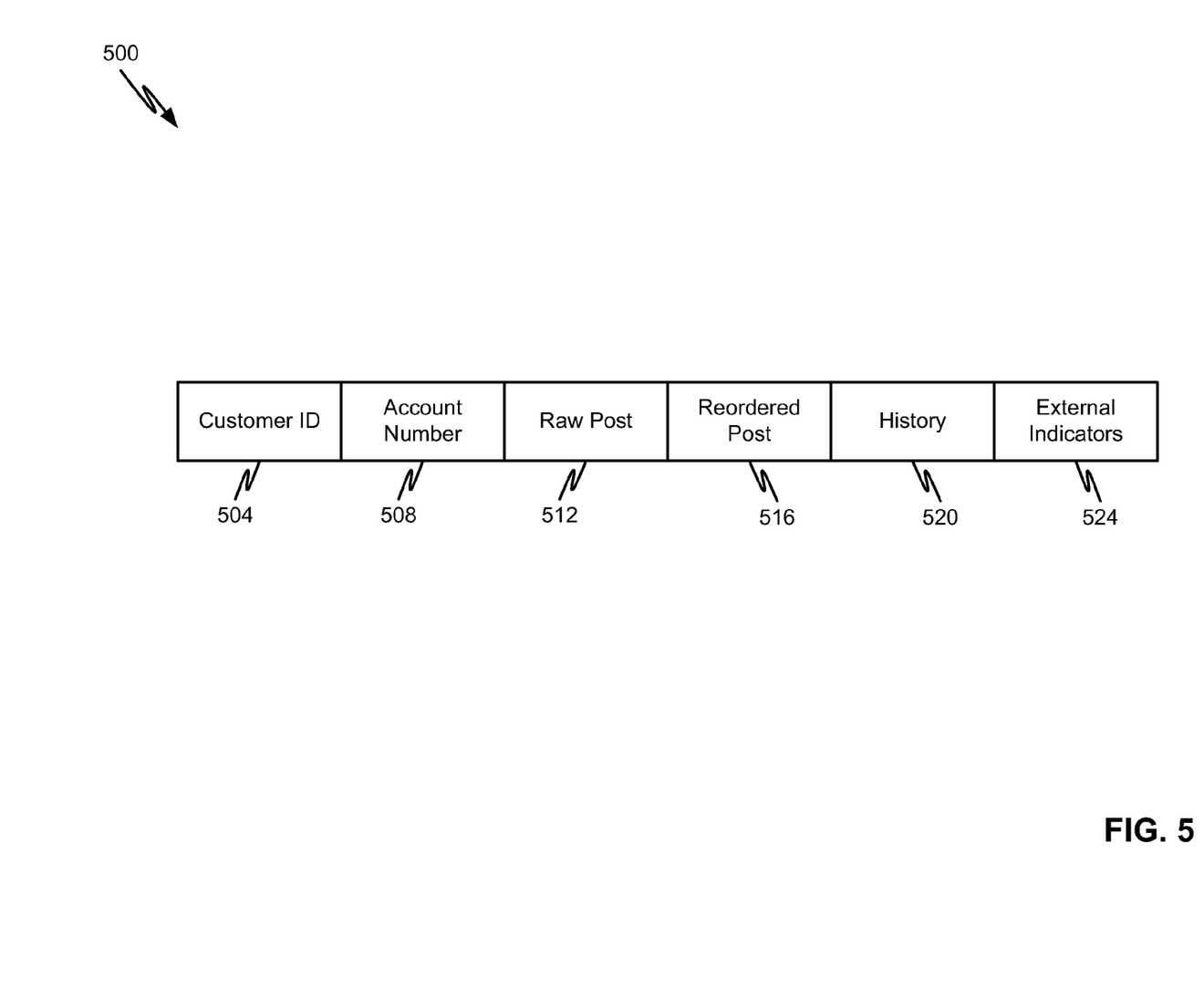
FIG. 5 is a data diagram of data that is used by the automatic timeline and topic normalization mechanism in accordance with embodiments of the present disclosure.

An embodiment of dialog reorder data 500 is shown in FIG. 5. The phrase "dialog reorder data," as used herein, refers to a collection of information from message elements 104, 108, 112, 116 and external event indicators 120 in a dialog that may have been analyzed, normalized, summarized, simplified, and stored by an organization and displayed upon request. Dialog reorder data can include, but is not limited to, customer identification information, an account number, raw data from a post on a web site or on a social media site, a reordered, summarized, and/or richly developed display of a post, a service and/or transaction history, and external event indicators that might have been considered and/or used for temporal correction and optimized for use by the agent 324.

The dialog reorder data 500 may include specific information from interactions with a third party, a direct customer of the contact center, employees of the contact center, news organizations, weather reporting organizations, RSS feeds, emergency agencies, power companies, or other users of automatic timeline and topic normalization mechanism through a browser or other system interface.

The dialog reorder data 500 may include metadata. The metadata may include information on the user 504. User information may include name, age, gender, first language, location, contact information, contact preference, profile data, and other customer identifying attributes and/or details. It may also include an account number 508 that may be associated with a user.

The database information may include the actual post 512 from the social media or web site. The raw post information may be presented to the agent 324 at the agent workstation 332 when the work item is assigned. In addition to the raw post data, the analyzed and potentially manipulated post may be presented to the agent 324, in field 516 which can include a richly ordered post, a summarization of the post, the original post, the original post and external information, or some combination produced by the temporal correction module 228. The historical data 520 may include any form of application, orders, returns, product preferences, searches, correspondence, and/or other types of user history. The external event indicator field 524 may include information about outside events, including natural disasters, major weather events, terrorist attacks, flight information, and other large-scale events that may influence the ability of the company to provide service or that prevent or disrupt services to the users. The event information may be used during dialog analysis, including but not limited to an external event indicator insertion on the timeline and/or as an alert sent to the agent 324.

Information from the database 316 may also include additional data that has been collected in response to multiple interactions with a company or a contact center. While there are only six input fields 504, 508, 512, 516, 520, and 524 as shown in FIG. 5, there may be more or fewer data fields associated with data structure 500.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

What is claimed is:

1. A method, comprising:
   receiving a single message containing a plurality of message elements in a first order, wherein the plurality of message elements are descriptive of a plurality of events that occurred prior to creation of the single message;
   determining, from the content of the plurality of message elements, that the plurality of message elements are not in a proper temporal order when in the first order;
   in response to determining that the message elements are not in a proper temporal order, identifying a second order for the plurality of message elements; and
   presenting at least some of the plurality of message elements in the second order via a user interface of a communication device.

2. The method of claim 1, wherein the first order corresponds to an order in which a customer presented the plurality of message elements in the single message.

3. The method of claim 2, wherein the second order corresponds to the proper temporal order.

4. The method of claim 1, wherein the second order comprises fewer message elements than the first order.

5. The method of claim 1, wherein all of the plurality of message elements are presented in the second order.

6. The method of claim 1, further comprising:
   referencing at least one event external to the single message; and
   utilizing information about the at least one event and a time at which the at least one event occurred to identify the second order.

7. The method of claim 6, wherein the at least one event external to the single message comprises at least one of an agent service note, a weather occurrence, a power outage, a power interruption, a flight time, and a message event from a second message.

8. The method of claim 1, further comprising:
   determining that the plurality of message elements comprise at least one element corresponding to a beginning and end of an interaction between a customer and a contact center agent;
   analyzing an amount of time between the beginning and end of the interaction; and
   based on the analysis of the amount of time between the beginning and end of the interaction, generating a performance metric for the contact center agent.

9. A non-transitory computer-readable medium comprising processor-executable instructions, the instruction comprising:
   instructions configured to receive a single message containing a plurality of message elements in a first order, wherein the plurality of message elements are descriptive of a plurality of events that occurred prior to creation of the single message;
   instructions configured to determine, from the content of the plurality of message elements, that the plurality of message elements are not in a proper temporal order when in the first order;
   in response to determining that the message elements are not in a proper temporal order, instructions configured to identify a second order for the plurality of message elements; and
   instructions configured to present at least some of the plurality of message elements in the second order via a user interface of a communication device.

10. The computer-readable medium of claim 9, wherein the first order corresponds to an order in which a customer presented the plurality of message elements in the single message.

11. The computer-readable medium of claim 10, wherein the second order corresponds to the proper temporal order.

12. The computer-readable medium of claim 9, wherein the second order comprises fewer message elements than the first order.

13. The computer-readable medium of claim 9, wherein all of the plurality of message elements are presented in the second order.

14. The computer-readable medium of claim 9, further comprising:
   instructions configured to reference at least one event external to the single message; and
   instructions configured to utilize information about the at least one event and a time at which the at least one event occurred to identify the second order.

15. The computer-readable medium of claim 14, wherein the at least one event external to the single message comprises at least one of an agent service note, a weather occurrence, a power outage, a power interruption, a flight time, and a message event from a second message.

16. The computer-readable medium of claim 9, further comprising:
   instructions configured to determine that the plurality of message elements comprise at least one element corresponding to a beginning and end of an interaction between a customer and a contact center agent;
   instructions configured to analyze an amount of time between the beginning and end of the interaction; and
   instructions configured to generate a performance metric for the contact center agent based on the analysis of the amount of time between the beginning and end of the interaction.

17. A communication system, comprising:
   a temporal correction module configured to receive a single message containing a plurality of message elements in a first order, wherein the plurality of message elements are descriptive of a plurality of events that occurred prior to creation of the single message, and perform the following operations:
      determine, from the content of the plurality of message elements, that the plurality of message elements are not in a proper temporal order when in the first order;
      in response to determining that the message elements are not in a proper temporal order, identify a second order for the plurality of message elements; and
      present at least some of the plurality of message elements in the second order via a user interface of a communication device.

18. The system of claim 17, wherein the first order corresponds to an order in which a customer presented the plurality of message elements in the single message, wherein the second order corresponds to the proper temporal order, and wherein the second order comprises fewer message elements than the first order.

19. The system of claim 17, further comprising:
a temporal correction module configured to perform the following operations:
reference at least one event external to the single message;
utilize information about the at least one event and a time at which the at least one event occurred to identify the second order;
determine that the plurality of message elements comprise at least one element corresponding to a beginning and end of an interaction between a customer and a contact center agent;
analyze an amount of time between the beginning and end of the interaction; and
based on the analysis of the amount of time between the beginning and end of the interaction, generate a performance metric for the contact center agent.

20. The system of claim 19, wherein the at least one event external to the single message comprises at least one of an agent service note, a weather occurrence, a power outage, a power interruption, a flight time, and a message event from a second message.

* * * * *